United States Patent
Briggs

(10) Patent No.: US 6,359,700 B1
(45) Date of Patent: Mar. 19, 2002

(54) METHOD AND APPARATUS FOR PREVENTING PRINT OVERRUNS BY RASTERIZING COMPLEX PAGE STRIPS USING AN AUXILIARY PROCESSOR

(75) Inventor: Randall D. Briggs, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/299,833

(22) Filed: Apr. 26, 1999

(51) Int. Cl.7 ............................................. G06K 15/02
(52) U.S. Cl. ........................ 358/1.17; 358/1.1; 358/1.18
(58) Field of Search ........................... 358/1.1, 1.2, 1.9, 358/1.12, 1.13, 1.14, 1.15, 1.16, 1.17, 1.18, 296, 298; 382/232, 235, 234, 244, 240, 239, 243

(56) References Cited

U.S. PATENT DOCUMENTS

| 5,129,049 A | 7/1992 | Cuzzo et al. ............... 358/1.14 |
| 5,444,827 A | 8/1995 | Briggs et al. .............. 358/1.14 |
| 5,850,504 A * | 12/1998 | Cooper et al. ............. 358/1.18 |
| 6,115,135 A * | 9/2000 | Campbell et al. .......... 358/1.16 |

* cited by examiner

Primary Examiner—Mark Wallerson

(57) ABSTRACT

A page printer stores a page processing procedure that includes code for converting display commands to a rasterized image and further stores display commands allocated to plural page strips of a page. The page includes N page strips. The printer includes a print engine adapted to print one page per X units of time, an auxiliary processor adapted to operate in conjunction with said page processing procedure and a main processor. The main processor is operable in conjunction with the page processing procedure and (i) determines an amount of processing time required to process each page strip of a page into rasterized image data; and (ii) for a page strip whose processing time exceeds X/N units of time, determines if sufficient time is available, once the print engine commences printing said page, to convert the page strip from display commands to a rasterized image before the rasterized image is to be rendered by the print engine. If yes, the main processor assigns the page strip to be processed by the auxiliary processor. Otherwise, if the page strip processing time does not exceed X/N units of time, the main processor processes the page strip.

6 Claims, 3 Drawing Sheets

METHOD AND APPARATUS FOR PREVENTING PRINT OVERRUNS BY RASTERIZING COMPLEX PAGE STRIPS USING AN AUXILIARY PROCESSOR

FIELD OF THE INVENTION

This invention relates to printers, and more particularly, to a method and apparatus for assuring that a constant speed print mechanism has rasterized data awaiting printing.

BACKGROUND OF THE INVENTION

Prior art page printers capture an entire page image before any images are placed on paper. In printers which employ laser engines as the "print mechanism", data must be provided at a speed that is fast enough to keep up with the print action. In such printers, formatting is either performed on the host computer, with large volumes of rasterized image data shipped to the printer at high speed, or on a formatter within the printer itself. Since a laser printer engine operates at a constant speed, if rasterized image data is not available when a previous segment of image data has been imprinted, a "print overrun" occurs and the page is not printable.

Various methods have been used in the prior art to avoid print overruns. For example, a full raster bit map of an entire page has been stored in the printer so that the print mechanism always has rasterized data awaiting printing. This solution requires large amounts of random access memory for each page. A main method for assuring the availability of print data to a laser printer constructs a display list and builds a page description in two steps. During formatting, a page description received from a host is converted into a series of simple commands, called display commands, that describe what must be printed. The display commands are parsed and the described objects are then rendered into a raster bit map.

The prior art has improved on the main method by sorting display commands according to their vertical position on a page. The page is then divided into sections called page strips, which page strips are then individually rasterized and passed to the print engine for printing. When the display commands are rasterized at a fast enough pace, the same memory used to store a first page strip can be reused for a subsequent page strip further down the page. However, under certain circumstances, certain page strips will include many display commands and thus require a longer than normal time for rasterization.

In the previously marketed laser printers, three raster buffers have been employed, with the first buffer being reused for a fourth strip on a page, the main reused for a fifth strip, etc. In the case of a complex strip, rasterization time could increase to such an extent that a succeeding page strip could not be delivered on time and a print overrun would occur.

In U.S. Pat. No. 5,129,049 to Cuzzo et al., a page printer is described which addresses the problem created by complex page strips. Cuzzo et al. divide each page of text into lateral page strips and allocate a page strip rasterization time to each page strip, based upon the printer's page print time. A rasterization time for each page strip is then calculated, based upon the complexity of the display commands contained within the page strip. If rasterization time for a page strip exceeds the allocated page strip rasterization time, indicating a "complex" page strip, the page strip is rasterized before the print engine is started. Otherwise, the display commands for the page strip are inserted into a queue and are rasterized in order as they are reached, after the print engine commences printing. Whenever a complex page strip is reached for processing, its pre-rasterized version is immediately accessed and employed—thereby preventing a print overrun.

One drawback of the Cuzzo et al procedure is that page throughput for the printer is somewhat affected by the prerasterization actions since time must be taken to accomplish prerasterization before the paper is started to move through the printer. This delay, added to other page processing times, causes a limitation on the page printing capability of the printer.

In U.S. Pat. No. 5,444,827, a page printer is disclosed that includes a variable frequency clock for producing at least two clock frequencies, one higher than the other. The page printer stores a page processing procedure and data comprising full page strips. A processor operates at the first clock frequency in conjunction with the page processing procedure and derives a rasterization execution time (RET) for display commands to be printed in each page strip of a page. The processor compares the RET for each page strip with a threshold value and rasterizes, in a standard manner, any page strip whose RET is equal to or less than a threshold value (while operating under the influence of the first clock frequency). When a complex page strip is found (whose RET exceeds the threshold), the variable frequency clock is controlled to generate the main higher frequency clock signal and thus causes the processor to operate at a rate determined by the higher clock frequency so that display commands in the complex page strip are rasterized at a higher speed. While the Briggs et al. procedure enabled on-the-fly rasterization of complex page strips, extended operation of the processor at the higher clock frequency could lead to overheating problems.

Accordingly, it is an object of this invention to provide an improved method and apparatus for reducing the possibility of print overruns in a constant speed print mechanism.

It is another object of this invention to provide an improved method for preventing print overruns which enables on-the-fly rasterization of at least some complex page strips, without leading to overheating problems.

SUMMARY OF THE INVENTION

A page printer stores a page processing procedure that includes code for converting display commands to a rasterized image and further stores display commands allocated to plural page strips of a page. The page includes N page strips. The printer includes a print engine adapted to print one page per X units of time, an auxiliary processor adapted to operate in conjunction with said page processing procedure and a main processor. The main processor is operable in conjunction with the page processing procedure and (i) determines an amount of processing time required to process each page strip of a page into rasterized image data; and (ii) for a page strip whose processing time exceeds X/N units of time, determines if sufficient time is available, once the print engine commences printing said page, to convert the page strip from display commands to a rasterized image before the rasterized image is to be rendered by the print engine. If yes, the main processor assigns the page strip to be processed by the auxiliary processor. Otherwise, if the page strip processing time does not exceed X/N units of time, the main processor processes the page strip.

DETAILED DESCRIPTION OF THE INVENTION

Figure 1:
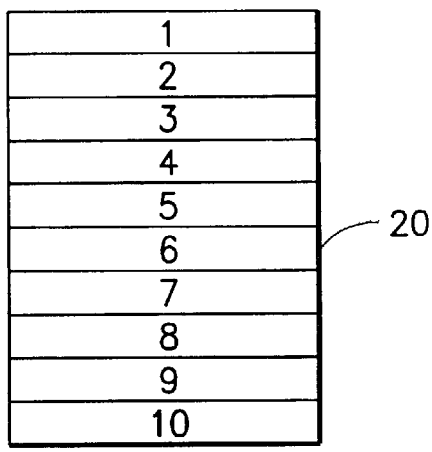
FIG. 1 shows an outline of a page and how it is broken into ten contiguous page strips.

Referring to FIG. 1, a page printer incorporating the invention treats a page 20 as a series of strips. As an example, ten strips are shown, each one covering a horizontal aspect of page 20. The choice of ten strips is merely exemplary and other page strip allocations are contemplated. Text, graphics, etc. appearing in any one strip are treated separately during the processing of a page. If it is assumed that the page printer has the capability of producing eight pages per minute, each page will be produced in 7.5 seconds. Since there are ten strips, each strip is arbitrarily allocated a page strip rasterization time (PSRT) of 0.75 seconds. At a gross level, PSRT indicates the available time for processing (i.e., rasterizing) a series of display commands in a page strip. If rasterization can occur within a PSRT, the page printer is able to maintain its specified page print rate.

Figure 2:
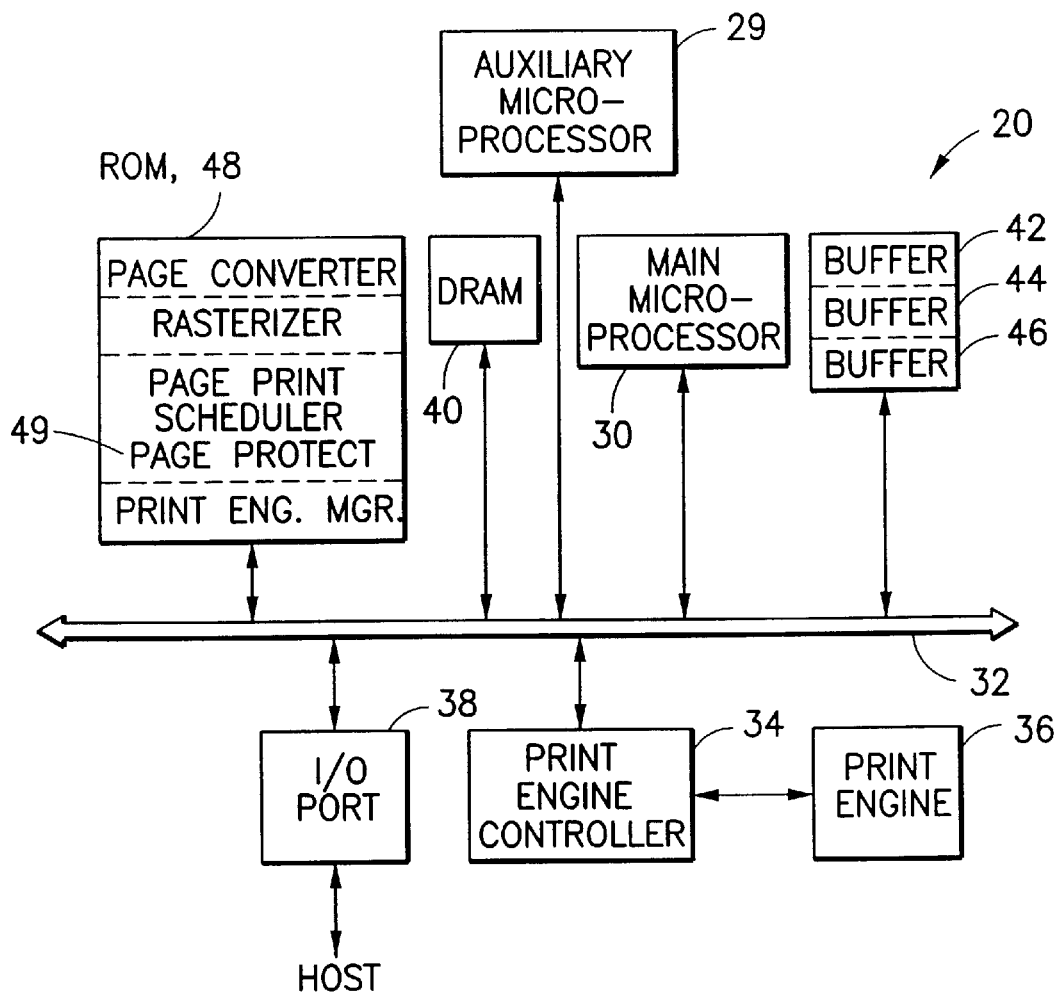
FIG. 2 is a high level block diagram of a printer that embodies the invention.

Turning to FIG. 2, a high level block diagram is shown of page printer 28 incorporating the invention. The page printer includes plural microprocessors, e.g., auxiliary microprocessor 29 and main microprocessor 30. The provision of two microprocessors is for exemplary purposes and it is to be realized that further microprocessors may be provided to enable even greater performance improvements. Assume that main microprocessor 30 provides primary control of printer 28 and additionally communicates with other elements of printer 28 via bus 32. A print engine controller 34 and associated print engine 36 connect to bus 32 and provide the print output capability for printer 28. Print engine 36 is preferably a laser printer that employs an electrophotographic drum imaging system, as is well known in the art.

An I/O port 38 provides communications between printer 28 and a host computer (not shown) and receives page descriptions from the host for processing. A dynamic random access memory (DRAM) 40 provides random access memory for printer 28. A portion of DRAM 40 (shown separately) includes three, pre-allocated buffers 42, 44 and 46 which are employed during page strip processing. Page strip buffers 42, 44 and 46 are preallocated. During the print process, each receives a page strip containing display commands, which page strip is then converted to a rasterized image and is passed to print engine controller 34 and print engine 36. Only after one of buffers 42, 44 or 46 becomes available, can a new page strip be inserted.

A read only memory (ROM) 48 holds firmware which controls the operation of the page printer. Among the code procedures stored in ROM 48 is the following: a page converter, rasterizer, page print scheduler (includes a page protect feature) and a print engine manager. The page converter firmware converts a page description received from the host to a display command list. Each display command defines an object to be printed on the page. The rasterizer firmware converts each display command to an appropriate bit map which is passed to print engine 36 by print engine controller 34 and enables the generation of text/graphics etc. The page print scheduler controls the sequencing and transfer of page strip buffers to print engine controller 34. A print engine manager controls the operation of print engine controller 34 and, in turn, print engine 36.

Within the page print scheduler is a page protection procedure 49 which assures that print overruns do not occur during the processing of a page and performs the method of the invention, in conjunction with microprocessors 29 and 30.

The operation of the page printer shown in FIG. 2 commences when it receives a page description from a host computer via I/O port 38. The page description is placed in DRAM 40 and microprocessor 30 then accesses the page description, line by line, and builds a display command list using the page converter firmware in ROM 48. The display command list is a set of commands that describe what must be printed and forms an intermediate description of the page that will subsequently be converted to a rasterized bit map and utilized by print engine 36. As the display command list is being produced, the display commands are sorted by location on the page and allocated to page strips.

During the time that the page description is being converted to display commands, each command is examined and its rasterization execution time (RET) is found. The display commands are then positionally sorted and assigned to the various page strips, the RET's for all display commands assigned to each strip are summed to derive a total RET for each strip.

RET is the time needed to render an object from its display command form into a rasterized form. It is known that rasterization time is related to the size of an object and it has been further found that the rasterization time can be found by summing three separate coefficients. The first coefficient is termed "overhead" and is the fixed amount of time a microprocessor spends on an object, independent of its size. The main coefficient is "height cost" which is proportional to the object's height, independent of its width. The third coefficient of this sum is termed "word cost" and is proportional to the number of words written to the destination bit map strip, independent of the object's height. The relationship between an object's actual RET and the method of predicting the RET is dependent upon the rasterization algorithm used and the execution speed of the microprocessor. Thus additional coefficients may be deemed useful, dependent upon the specifically used rasterization algorithms.

RET for all objects (e.g., vectors, trapezoids, bit maps) can thus be determined in advance, each with a different set of coefficients. Once the coefficients are determined for various expected objects, they are stored in a table and subsequently accessed when the type and dimensions of an object to be printed become known. Thus, RET for any display command can be readily determined by a table lookup of precalculated coefficients followed by a calculation of the sum of the coefficients, or modified by the objects size.

As can now be seen, during page composition, the page printer computes the size of an object when placing it's display command in the display command list. Given the object's size and its complexity coefficients, the total time needed to render that object into rasterized form is added to the RET of objects already contained within the list. Once page composition is complete, a total RET needed to render the entire display list is known, as is the time required to render each individual page strip.

At this point, the composed page is turned over for printing to a page print scheduler contained in ROM 48. The page print scheduler firmware contains a page protection procedure 49 which prevents print overruns as a result of any strip requiring more rasterization time than PSRT.

Figure 3:
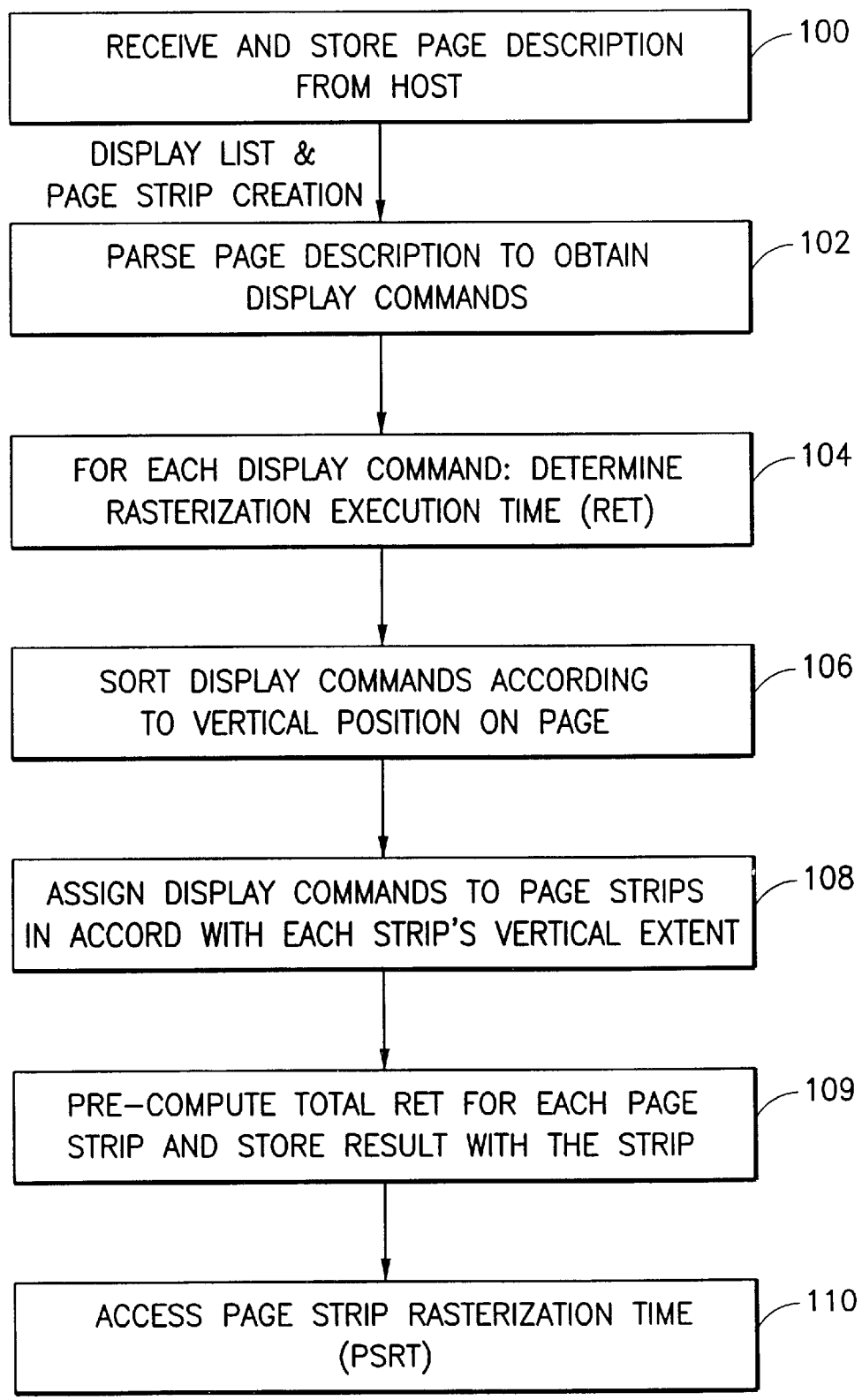
FIGS. 3 and 4 show a high level flow diagram describing the method of the invention.
Figure 4:
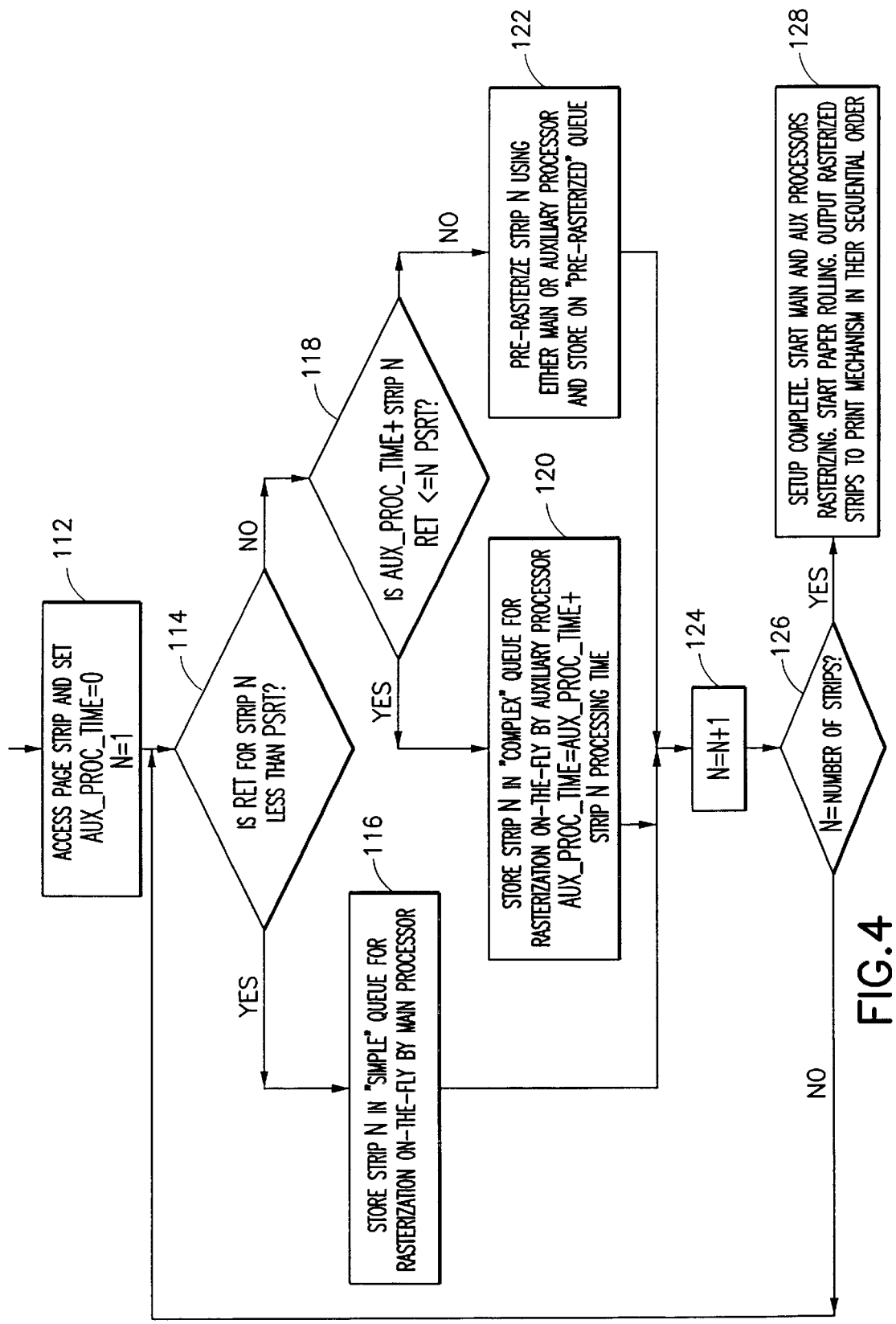

The method of the invention is performed under control of page protect procedure 49 and will be described in conjunction with the flow diagram shown in FIGS. 3 and 4. Initially, the page printer receives and stores a page description from the host computer (step 100). Main microprocessor 30 then calls the page converter code from ROM 48 that, in turn, parses the page description and creates a display command list (step 102). Each display command is examined and its rasterization execution time (RET) is found (step 104). The display commands are then sorted in accordance with their vertical position on the page (step 106), and assigned to page strips in accordance with each page strip's vertical extent (step 108).

Page protect procedure commences by calculating a total RET for all display commands for each strip (step 109). The page strip rasterization time (PSRT) constant is then accessed (step 110). PSRT may be either precomputed and stored, or calculated by dividing the page print time by the number of page strips.

A first page strip of N page strips (i.e., N=1) is now accessed, along with its total RET value. An auxiliary processing time value is set equal to 0 (step 112). The auxiliary processing time value is the time to complete a rasterization task for a complex page strip, which task has been assigned to auxiliary microprocessor 29. When the first page strip is accessed, no task has as yet been assigned to auxiliary microprocessor 29 so the value is set =0.

The total strip RET is then compared to PSRT to determine if its rasterization time is less than PSRT (decision step 114). If yes, the page strip is assigned to a "simple" rasterization queue for rasterization "on-the-fly" by main microprocessor 30 (step 116). If no, the procedure moves to decision step 118 where it is determined if the sum of the current auxiliary processing time value and the RET for the strip currently being processed is less than or equal to the number N of the current page strip to be rasterized multiplied by PSRT. More specifically, this calculation determines if the sum of the time required for strip rasterization tasks already assigned to auxiliary microprocessor 29, added to the amount of time it will take to rasterize the current page strip, is less than or equal to the available time before a next page strip will require rasterization. For example, if the current page strip is N=4, then the calculation indicates that there is a maximum time of 4*PSRT available to accomplish the rasterization of the current strip before the strip must be fed to the print engine for rendering to the page.

Accordingly, if decision step determines yes (i.e., auxiliary processor 29 has sufficient time to rasterize the page strip before it is required by the print engine), the page strip is assigned to a "complex" queue for rasterization "on-the-fly" by auxiliary microprocessor 29 (step 120). Further, the auxiliary processing time value is increased by the RET value for the current page strip.

If decision step determines "no", the page strip is pre-rasterized by either microprocessor, depending upon availability, and the page strip is assigned to a pre-rasterized queue (step 122). This accommodates the condition where there is insufficient time available, at the point where the current page strip will be required by the print engine to accommodate an on-the-fly rasterization action.

Next, the value of N is incremented by one (step 124) and decision step 126 determines if all strips have been processed. If no, the procedure recycles back to decision step 114 and continues. If yes, the page rasterization set-up is complete (step 128). In such case, processors 29 and 30 commence rasterizing page strips while the print engine is also started (e.g., the paper commences moving through the print path). The print engine manager accesses the page strips from the page strip queues in sequence and in accordance with their relative positions on the page.

As can thus be seen, the procedure of the invention uses an auxiliary microprocessor to accomplish on-the-fly rasterization of complex page strips so long as sufficient time is available to accomplish the rasterization and have the page strip ready for dispatch to the print engine when the page strip is to be rendered.

It should be understood that the foregoing description is only illustrative of the invention. Various alternatives and modifications can be devised by those skilled in the art without departing from the invention. While the invention has been described in a laser printer environment, it is equally applicable to other types of printers which may experience print overrun type problems (e.g. ink jet printers). Accordingly, the present invention is intended to embrace all such alternatives, modifications and variances which fall within the scope of the appended claims.

I claim:

1. A page printer for storing a page processing procedure including code for converting display commands to a rasterized image and for further storing display commands allocated to plural page strips of a page, said page including N page strips, said page printer including a print engine adapted to print one page per X units of time, and further comprising:
   an auxiliary processor adapted to operate in conjunction with said page processing procedure; and
   a main processor operable in conjunction with said page processing procedure for (i) determining an amount of processing time required to process each page strip of a page into rasterized image data; (ii) for a page strip whose processing time exceeds X/N units of time, determining if sufficient time is available, once said print engine commences printing said page, to convert said page strip from display commands to a rasterized image before said rasterized image is to be rendered to said page by said print engine, and if yes, assigning said page strip to be processed by said auxiliary processor; and (ii) for a page strip whose processing time does not exceed X/N units of time, assigning said page strip to be processed by said main processor.

2. The page printer as recited in claim 1, wherein if said main processor, for a page strip whose processing time exceeds X/N units of time, determines that there is insufficient time, once said print engine commences printing said page, to convert said page strip from display commands to a rasterized image before said rasterized image is to be rendered to said page by said print engine, said main processor causes said page strip to be processed before the commencement of printing by said print engine.

3. The page printer as recited in claim 2, wherein said main processor, for any page strip whose processing time exceeds X/N units of time, determines if a sufficient amount of time is available to process said page strip by finding an amount of time available before printing of said page strip is to commence and determines if said amount of time is less or more than the time required to process said page strip and any other page strip whose processing time exceeds X/N units of time and must be processed first.

4. A method for controlling a page printer which converts display commands in plural page strips to rasterized images, each page including N page strips, said page printer including a print engine adapted to print one page per X units of time and at least an auxiliary processor and a main processor, said method comprising the steps of
   (i) determining an amount of processing time required to process each page strip of a page into rasterized image data;

(ii) for a page strip whose processing time exceeds X/N units of time, determining if sufficient time is available, once said print engine commences printing said page, to convert said page strip from display commands to a rasterized image before said rasterized image is to be rendered to said page by said print engine;

(iii) if yes, assigning said page strip to be processed by said auxiliary processor; and (iv) for a page strip whose processing time does not exceed X/N units of time, assigning said page strip to be processed by said main processor.

5. The method as recited in claim 4, wherein, for a page strip whose processing time exceeds X/N units of time and, once said print engine commences printing said page, there is insufficient time to convert said page strip from display commands to a rasterized image before said rasterized image is to be rendered to said page by said print engine, comprising the further step of:

processing said page strip before commencement of printing by said print engine.

6. The method as recited in claim 5, wherein, for any page strip whose processing time exceeds X/N units of time, step (ii) determines if a sufficient amount of time is available to process said page strip by finding an amount of time available before printing of said page strip is to commence and determines if said amount of time is less or more than the time required to process said page strip and any other page strip whose processing time exceeds X/N units of time and must be processed first.

* * * * *